US007913550B2

(12) United States Patent
Schoenthaler et al.

(10) Patent No.: US 7,913,550 B2
(45) Date of Patent: Mar. 29, 2011

(54) METHOD TO DIAGNOSE AN EXHAUST GAS SENSOR DISPOSED IN AN EXHAUST GAS REGION OF AN INTERNAL COMBUSTION ENGINE AND DEVICE TO IMPLEMENT THE METHOD

(75) Inventors: Jochen Schoenthaler, Wimsheim (DE); Stefan Wickert, Albershausen (DE)

(73) Assignee: Robert Bosch GmbH, Stuttgart (DE)

( * ) Notice: Subject to any disclaimer, the term of this patent is extended or adjusted under 35 U.S.C. 154(b) by 113 days.

(21) Appl. No.: 12/028,545

(22) Filed: Feb. 8, 2008

(65) Prior Publication Data

US 2009/0044612 A1     Feb. 19, 2009

(30) Foreign Application Priority Data

Feb. 9, 2007    (DE) .......................... 10 2007 006 489

(51) Int. Cl.
*G01M 15/10*    (2006.01)
(52) U.S. Cl. .................................... 73/114.69
(58) Field of Classification Search ............... 73/114.69, 73/114.71, 114.73, 114.76, 114.77
See application file for complete search history.

(56) References Cited

U.S. PATENT DOCUMENTS

| 4,887,576 A * | 12/1989 | Inamoto et al. | 123/688 |
| 7,418,322 B2 * | 8/2008 | Kariya et al. | 701/34 |
| 2003/0097873 A1 * | 5/2003 | Surnilla | 73/118.1 |
| 2005/0102076 A1 * | 5/2005 | Kariya et al. | 701/34 |
| 2007/0227124 A1 * | 10/2007 | Fujiki et al. | 60/277 |
| 2008/0148830 A1 * | 6/2008 | Wickert et al. | 73/114.71 |

FOREIGN PATENT DOCUMENTS

| DE | 44 26 020 | 2/1996 |
| DE | 102 54 843 | 6/2004 |
| DE | 10 2004 031 624 | 2/2006 |
| DE | 10 2005 014 662 | 12/2006 |

* cited by examiner

*Primary Examiner* — Eric S McCall
(74) *Attorney, Agent, or Firm* — Merchant & Gould P.C.

(57) ABSTRACT

A method to diagnose an exhaust gas sensor disposed in the exhaust gas region of an internal combustion engine, wherein provision is made for a comparison of a measurement for at least one exhaust gas component with a measurement of the exhaust gas component, which is ascertained on the basis of an exhaust gas sensor signal, and a device to implement the method are proposed. The diagnosis is only implemented if a change in at least one operating parameter of the internal combustion engine and/or at least one parameter of the exhaust gas is detected during the running operation of the internal combustion engine. Provision is made in the diagnosis for an averaging of the measurement for at least the one exhaust gas component as well as of the measurement for the exhaust gas component, which is provided by the exhaust gas sensor. Provision is additionally made for a subsequent comparison of the two averages and for an error signal to be provided if the difference of the two averages exceeds a difference threshold value. The procedural approach allows for the diagnosis to occur without a diagnostic intervention into the operation of the internal combustion engine and without an intervention into an open-loop control, which if need be is present, for the metering of a reagent substance, which is introduced into the exhaust gas region of the internal combustion engine to convert at least one exhaust gas component.

16 Claims, 2 Drawing Sheets

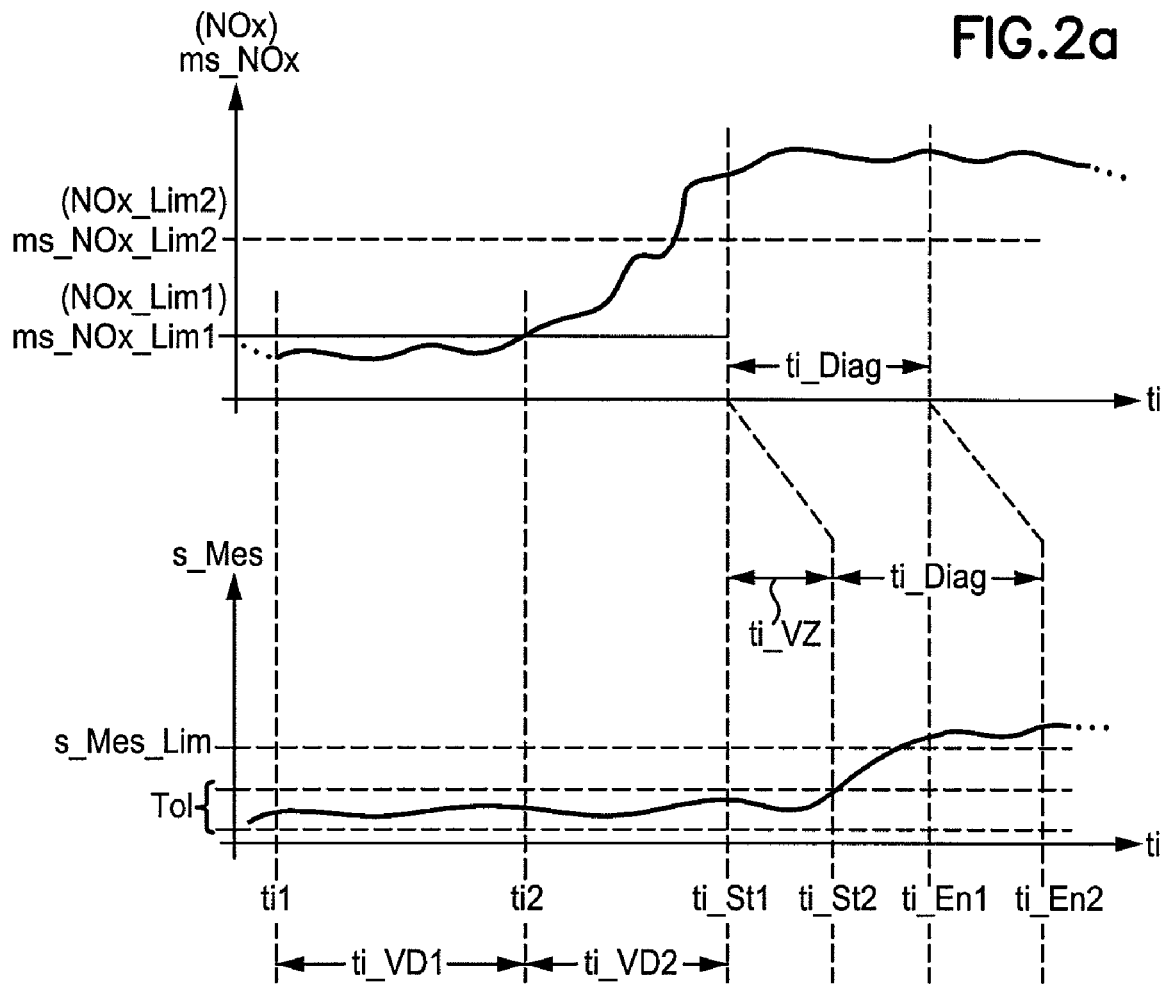

METHOD TO DIAGNOSE AN EXHAUST GAS SENSOR DISPOSED IN AN EXHAUST GAS REGION OF AN INTERNAL COMBUSTION ENGINE AND DEVICE TO IMPLEMENT THE METHOD

TECHNICAL FIELD

The invention proceeds from a method to diagnose an exhaust gas sensor disposed in an exhaust gas region of an internal combustion engine and from a device to implement the method according to the class of the coordinated claims.

A control unit program as well as a control unit program product is also the subject matter of the invention at hand.

BACKGROUND

In the German patent DE 44 26 020 A1 a method is described, wherein the operational capability of a catalytic converter disposed in an exhaust gas region of an internal combustion engine is monitored. The monitoring is implemented on the basis of the increase in temperature, which occurs in the catalytic converter due to the exothermal conversion of oxidable exhaust gas components. Two temperature signals are ascertained, whereby the first temperature signal is based on the measurement of the temperature downstream after the catalytic converter, and the second temperature signal is calculated with the aid of a model.

A method to operate a catalytic converter, which is used to purify the exhaust gas of an internal combustion engine, and a device to implement the method have become known from the German patent DE 10 2004 031 624 A1. Provision is made in said device for an open-loop or closed-loop control of a reagent substance fill level in the catalytic converter to a specified storage set point. The targeted specification of the storage set point assures on the one hand that a sufficient quantity of the reagent substance is available to remove as completely as possible at least one undesirable exhaust gas component and on the other hand that a reagent substance slip is avoided. A model of the catalytic converter is described, which ascertains the reagent substance fill level in the catalytic converter on the basis of the reagent substance stream flowing into the catalytic converter, if need be the NOx mass flow flowing into the catalytic converter, if need be the NOx mass flow leaving the catalytic converter and if need be a reagent substance slip.

In the German patent DE 10 2005 014 662 A1, a method to diagnose an exhaust gas treatment device for the conversion of at least one undesirable exhaust gas component contained in the exhaust gas region of an internal combustion engine and a device to implement the method are described, wherein a measurement for the current conversion of the undesirable exhaust gas component is ascertained from an exhaust gas component, which is ascertained upstream before the exhaust gas treatment device and measured downstream after the exhaust gas treatment device. Provision is made, for example, for the NOx concentration or the NOx mass flow to be the exhaust gas component. Provided that the measurement for the conversion undershoots a threshold value, which can be, for example, definitely specified or specified as a function of operating parameters of the internal combustion engine and/or as parameters of the exhaust gas, an error signal is provided.

Finally the German patent DE 102 54 843 A1 describes a method to monitor an exhaust gas treatment system, to which a reducing agent is supplied. The quantity of the reducing agent, which is supplied, is changed in the diagnosis. An error is detected if due to the specified change in the reducing agent, a signal of an exhaust gas sensor disposed after the exhaust gas treatment system likewise changes in an unexpected manner.

The task underlying the invention is to specify a method to diagnose an exhaust gas sensor disposed in the exhaust gas region of an internal combustion engine as well as a device to implement the method, which has the least possible error rate.

This task is solved in each case by the characteristics specified in the independent claims.

SUMMARY

The procedural approach according to the invention with the characteristics of the independent claim of the method has the advantage, in that the diagnosis can be implemented without an intervention into the normal operation of the internal combustion engine and without an intervention into a control loop (including an open-loop or closed loop control), which is present if necessary, for the metering of a reagent substance into the exhaust gas region of the internal combustion engine. In this way a deterioration of the exhaust gas values is avoided, which up until now was taken for granted within the scope of a diagnosis. The diagnosis is only implemented or an already implemented diagnosis is only evaluated if suitable framework conditions for the diagnosis have been present.

Advantageous modifications and embodiments of the procedural approach according to the invention result from the dependent claims.

Provision is made in one embodiment for a measurement for the load of the internal combustion engine and/or the rotational speed of the internal combustion engine and/or a measurement for the exhaust gas recirculation rate to be used as an operating parameter of the internal combustion engine.

Provision is made in an embodiment for the exhaust gas mass flow and/or the NOx concentration and/or the NOx mass flow to be used as a parameter of the exhaust gas.

Provision is made in an embodiment for the diagnosis only to be implemented if at least the one operating parameter of the internal combustion engine and/or at least the one parameter of the exhaust gas initially lie below a first threshold value for a specified first diagnostic preparation period.

Provision is preferably made for a second diagnostic preparation period to be specified after the first diagnostic preparation period and after at least the one operational parameter of the internal combustion engine and/or at least the one parameter of the exhaust gas have exceeded the first threshold value. The diagnosis is only implemented in an effective manner if at least the one operating parameter of the internal combustion engine and/or at least the one parameter of the exhaust gas exceed a second threshold value within the second diagnostic preparation period.

With these measures a diagnostic result is achieved, which is as reliable as possible.

Provision is made in an embodiment for the diagnosis only to be evaluated if at least the one operating parameter of the internal combustion engine and/or at least the one parameter of the exhaust gas lie above the second threshold value during the diagnostic time period. This measure assures that when ascertaining the diagnostic result, the conditions do not change to a degree, which could have a negative effect on the diagnostic result.

In order to implement the diagnosis, provision is made for the averaging of the measurement for the exhaust gas component and an averaging of the measurement acquired by the exhaust gas sensor during the diagnostic time period. Preferably the averages are obtained using an integration. The averages are subsequently compared with each other. An error signal, which indicates a defective exhaust gas sensor, is provided if the difference in the averages exceeds a difference threshold value.

When ascertaining the average from the sensor signal, a time delay is advantageously specified in order to take into account the exhaust gas running time and if need be a response time of the exhaust gas sensor.

The device according to the invention for the implementation of the method concerns a control unit, which is specially designed to implement the method.

The control unit preferably contains at least one electrical memory, in which the steps of the method are deposited as the control unit program.

Provision is made in the control unit program for all of the steps of the method according to the invention to be executed if said program is operated in a control unit.

The control unit program product according to the invention with a program code stored on a machine-readable carrier executes the method according to the invention if the program is executed in a control unit.

Additional advantageous modifications and embodiments of the procedural approach according to the invention result from additional dependent claims. Examples of embodiment of the invention are depicted in the diagram and are explained in detail in the following description.

The following are shown:

DETAILED DESCRIPTION

Figure 1:
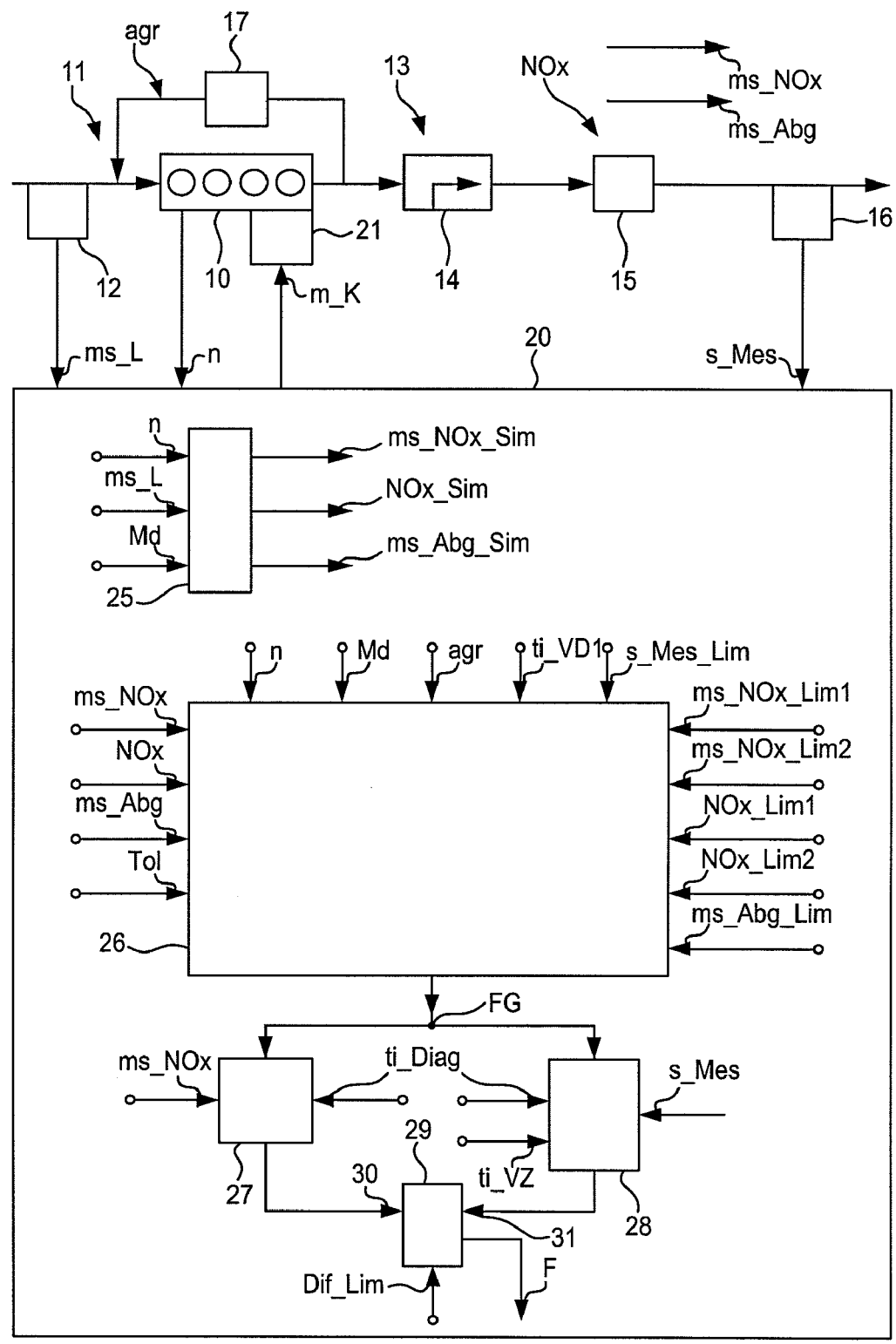
FIG. 1 a technical environment, wherein a method according to the invention is operating and FIGS. 2a and 2b signal curves as a function of time.

FIG. 1 shows an internal combustion engine 10, in whose intake region 11 an air sensor 12 and in whose exhaust gas region 13 a reagent substance introduction device 14, an emission control system 15 as well as exhaust gas sensor 16 are disposed. Provision is made for an exhaust gas recirculation 17 between the exhaust gas region 13 and the intake region 11, which sets a specified exhaust gas recirculation rate agr.

The air sensor 12 provides an air signal ms_L to a control unit 20. The internal combustion engine 10 provides an engine rotational speed n and the exhaust gas sensor 16 provides a sensor signal s_Mes to the control unit 20. The control unit 20 provides a fuel signal m_K to a fuel metering device 21. An exhaust gas mass flow ms_Abg and at least a NOx mass flow ms_NOx with a NOx concentration NOx occur in the exhaust gas region 13.

The control unit 20 contains a parameter ascertainment 25, an enabling 26, averagers 27, 28 as well as a comparator 29.

When operating the internal combustion engine 10, undesirable exhaust gas components arise as a function of the operating condition of the internal combustion engine 10, which the emission control system 15, for example at least a catalytic converter (for example an SCR catalytic converter and/or storage catalytic converter), is supposed to convert as extensively as possible.

The exhaust gas sensor 15 is disposed downstream after the emission control system 15. The exhaust gas sensor 16 acquires at least one of the exhaust gas components and provides the sensor signal s_Mes as a measurement for at least the one exhaust gas component. On the one hand an intervention can be made into the open-loop control of the internal combustion engine 10 with the sensor signal s_Mes. On the other hand an intervention can be made into an unspecified open-loop control for the regulation of the metering of the reagent substance to be introduced into the exhaust gas region 13 with the reagent substance introduction device 14 or for the regulation of a pre-stage of the reagent substance.

The reagent substance introduction device 14 sprays, for example, a reducing agent into the exhaust gas region 13, which is required in the emission control system 15, for example, to reduce the nitrogen oxide NOx. In this case, the emission control system especially contains a SCR catalytic converter.

In the example of embodiment depicted, the diagnosis of the exhaust gas sensor 16 is exemplarily shown at the NOx concentration NOx arising in the exhaust gas region 13, respectively the NOx mass flow ms_NOx arising in the exhaust gas region 13, which in each case is an exhaust gas component, respectively in each case a parameter of the exhaust gas in the exhaust gas region 13. The raw emissions of the internal combustion engine 10 before the catalytic converter can be used. Additionally or preferably as an alternative the parameters of the exhaust gas after passing through the emission control system 15 can be used, whereby the conversion factor of the emission control system 15 must be taken into account with respect to the exhaust gas component in the diagnosis.

The measurement for at least the one exhaust gas component can be calculated using known operating parameters of the internal combustion engine 10, as, for example, the engine rotational speed n and/or the load Md and/or the air taken in by the internal combustion engine. Provision can alternatively or additionally be made for an additional exhaust gas sensor, which provides a sensor signal as a measurement for the exhaust gas component.

A particular advantage of the procedural approach according to the invention results from the fact that an intervention is made neither into the open-loop or closed loop control of the internal combustion engine 10 nor into a control loop (including an open-loop or closed loop control) of the metering of a reagent substance into the exhaust gas region 13, for which provision is made if necessary. The diagnosis is intended to be performed during the running operation of the internal combustion engine 10, which is then free from outside influences, whereby a change in at least the one operating parameter of the internal combustion engine 10 and/or a change in at least the one parameter of the exhaust gas are detected.

Detection is initially made to determine whether a diagnosis can be implemented. The enabling ascertainment 26 is intended for this purpose, to which the engine rotational speed n, a measurement Md for the load of the internal combustion engine 10, the exhaust gas recirculation rate agr, a first diagnostic preparation period ti_VD1, the NOx mass flow ms_NOx, the NOx concentration NOx, the exhaust gas mass flow ms_Abg, a first and second NOx concentration threshold value ms_NOx_Lim1, NOx_Lim2, a tolerance band To1, a sensor signal threshold value s_Mes_Lim as well as an exhaust gas mass flow threshold value ms_Abg_Lim are provided. The enabling ascertainment 26 checks at least one input parameter for the existence of suitable conditions.

The measurement Md for the load of the internal combustion engine 10 as an example of an operating parameter of the internal combustion engine 10 corresponds, for example, to the position of an unspecified accelerator pedal of a motor vehicle, provided that provision is made for the internal combustion engine 10 to be the power train in the motor vehicle. The fuel signal m_K can additionally be used as a measurement Md for the load of the internal combustion engine 10. The measurement Md for the load of the internal combustion engine reflects further the torque, which is to be produced or which already has been produced by the internal combustion engine 10.

Because the exhaust gas recirculation rate agr likewise has a significant influence on at least one exhaust gas component, particularly the NOx concentration NOx, provision can be alternatively or additionally made for an evaluation of the exhaust gas recirculation agr as a further example of a parameter of the internal combustion engine 10.

At least one parameter of the exhaust gas can be additionally or alternatively checked to determine if the diagnosis can be implemented. Provision can be made for the exhaust gas mass flow ms_Abg to be the parameter. An evaluation of the NOx concentration NOx and/or the NOx mass flow ms_NOx can alternatively or additionally be performed. In the following, the description is exemplarily geared to the evaluation of the NOx concentration NOx arising in the exhaust gas region 13 and/or the NOx mass flow ms_NOx as exhaust gas parameters.

The NOx concentration NOx and/or the NOx mass flow ms_NOx can be ascertained in the parameter ascertainment 25 using at least the air signal ms_L and the measurement Md for the load of the internal combustion engine 10, if need be while taking into account the engine rotational speed n, and be made available as the calculated NOx concentration NOx_Sim, respectively as the calculated NOx mass flow ms_NOx_Sim.

In the following a check of the operating parameter of the internal combustion engine 10 and/or a check of the parameter of the exhaust gas is exemplarily geared to the check of the NOx concentration NOx, respectively the NOx mass flow ms_NOx.

Provision can initially be made to determine whether the NOx concentration NOx, respectively the NOx mass flow ms_NOx, lies below the first NOx concentration threshold value NOx_Lim1, respectively below the first NOx mass flow threshold value ms_NOx_Lim1, for the first specified diagnostic preparation period ti_VD1. According to FIG. 2b the first diagnostic preparation period ti_VD1 lies between a first and second point in time ti1, ti2. At the second point in time ti2, it is assumed according to FIG. 2a that the NOx concentration NOx and/or the NOx mass flow ms_NOx exceed the first NOx concentration threshold value NOx_Lim1, respectively the first NOx mass flow threshold value ms_NOx_Lim1.

Thereafter a second diagnostic preparation period ti_VD2 is advantageously specified, which ends at a first diagnostic starting point in time ti_St1. The diagnostic preparation period ti_VD2 is intended to take into account the rise time of the sensor signal s_Mes.

After the conditions for the implementation of the diagnosis are present, the enabling signal FG is provided by the enabling 26 at the first diagnostic starting point in time ti_St1. With the appearance of the enabling signal FG, the first averager 27 is initialized and begins at the latest now with the reading and the storage of the NOx concentration NOx, respectively the NOx mass flow ms_NOx. If need be the second averager 28 is simultaneously initialized with the appearance of the enabling signal FG, which likewise begins at the latest now with the reading and storage of the sensor signal s_Mes.

The averagers 27, 28 can, for example, be implemented as integrators, whose integration time is established by the diagnostic time period ti_Diag. The diagnostic time period ti_Diag begins at the first diagnostic starting point in time ti_St1 and ends at a first diagnostic end point in time ti_En1.

Basically the averaging of the sensor signal S_mes could begin in the second averager 28 simultaneously with the occurrence of the first diagnostic starting point in time ti_St1. When considering an exhaust gas running time in the exhaust gas region 13 and if need be when considering a response time of the exhaust gas sensor 16, provision is preferably made for the delay time ti_VZ, wherein the averaging in the second averager 28 is delayed with regard to the averaging in the first averager 27. The averaging in the second averager 28 thereby begins after the delay time ti_VZ has elapsed at a second diagnostic starting point in time ti_St2 and ends at a second diagnostic end point in time ti_En2.

The results 30, 31 of the averagers 27, 28 are compared with each other in the comparator 29, whereby the difference is compared with a difference threshold value Dif_Lim. The error signal F is provided if the difference exceeds the difference threshold value Dif_Lim.

The difference threshold value Dif_Lim preferably depends on at least one parameter of the exhaust gas and/or on at least one operating parameter of the exhaust gas emission system 15. The exhaust gas mass flow ms_Abg, the NOx concentration NOx or the NOx mass flow ms_NOx can, for example, be taken into account as parameters of the exhaust gas. The temperature of a catalytic converter contained in the emission control system 15 can, for example, be taken into account as an operating parameter of the emission control system 15.

It is to be taken into account in this instance that the evaluation of the difference takes place retrospectively. The error signal F is thus preferably only then provided if favorable conditions for the diagnosis have still been present up until the achievement of the diagnostic end point in time ti_En1, ti_En2. The signal evaluation has, however, already been implemented up until the achievement of the diagnostic end point in time ti_En1, ti_En2. The diagnosis is for this reason only then evaluated if during preferably the entire diagnostic time period ti_Diag, the enabling signal FG of the enabling 26 has still been present.

Provision can be made for a check to be one such condition. This check is to determine whether the NOx concentration NOx, respectively the NOx mass flow ms_NOx has constantly lain during the diagnostic time period ti_Diag above the second NOx concentration threshold value NOx_Lim2, respectively constantly above the second NOx mass flow threshold value ms_NOx_Lim2.

Provided that one of these additional conditions is not fulfilled, the enabling signal FG is taken back and the diagnostic result, which was already ascertained, is dismissed.

Provision can alternatively or additionally be made for a check to determine whether the sensor signal s_Mes has exceeded the sensor signal threshold value s_Mes_Lim during the diagnostic time period ti_Diag and/or stays above the sensor signal threshold value s_Mes_Lim during the remainder of the diagnostic time period ti_Diag.

Provision can alternatively or additionally be made for a check to determine whether the sensor signal s_Mes has left the tolerance band To1 during the diagnostic time period ti_Diag.

The tolerance band likewise preferably depends on at least one parameter of the exhaust gas and/or at least one operating parameter of the emission control system 15. The exhaust gas mass flow ms_Abg, the NOx concentration NOx or the NOx mass flow ms_NOx can, for example, again be taken into account as parameters of the exhaust gas. The temperature of a catalytic converter contained in the emission control system 15 can, for example, again be taken into account as the operating parameter of the emission control system 15.

The error signal can be deposited into a storage, which can be read out within the scope of a servicing of the internal combustion engine 10 or within the scope of an inspection of a motor vehicle. The error signal F can alternatively or additionally be displayed, whereby a technician servicing the internal combustion 10 immediately receives an indication of an error present in the exhaust gas sensor 16.

The invention claimed is:

1. A method of diagnosing an exhaust gas sensor disposed in an exhaust gas region of an internal combustion engine, the method comprising:
   detecting a change in at least one operating parameter of the internal combustion engine or a change in at least one exhaust gas parameter during miming operation of the internal combustion engine;
   ascertaining an exhaust gas component measurement from the exhaust gas sensor during running operation of the internal combustion engine; and
   comparing the exhaust gas component measurement to a calculated value of the exhaust gas component measurement, the calculated value being based upon at least one operating parameter during running operation of the internal combustion engine;
   wherein the diagnosis is non-intervening into a control loop of the internal combustion engine and, where an emission control system is present, non-intervening into a control loop for the metering of a reagent substance into an exhaust gas region of the internal combustion engine.

2. A method according to claim 1, wherein the at least one operating parameter includes a measurement for a load of the internal combustion engine, a rotational speed of the internal combustion engine, or a measurement for an exhaust gas recirculation rate.

3. A method according to claim 1, wherein the at least one exhaust gas parameter includes an exhaust gas mass flow, a NOx concentration, or a NOx mass flow.

4. A method according to claim 1, further comprising the at least one operating parameter of the internal combustion engine or the at least one exhaust gas parameter at least periodically being above a second threshold value during a diagnostic time period.

5. A method according to claim 1, wherein provision is made for the NOx concentration to be the exhaust gas component to be measured by the exhaust gas sensor.

6. A method according to claim 1, further comprising detecting that at least the one operating parameter of the internal combustion engine or that the at least one exhaust gas parameter initially lie for a specified first diagnostic preparation period beneath a first threshold value.

7. A method according to claim 6, further comprising specifying a second diagnostic preparation period after the first diagnostic preparation period and after at least the one operating parameter of the internal combustion engine or the at least one exhaust gas parameter have exceeded the first threshold value.

8. A method according to claim 7, further comprising taking into account a signal rise of a sensor signal during the second diagnostic preparation period.

9. A method according to claim 8, wherein provision is made for an averaging of the calculated value for the exhaust gas component and an averaging of the exhaust gas component measurement during a diagnostic time period, in that the averages are compared with each other and in that an error signal is provided if the difference of the averages exceeds a difference threshold value.

10. A method according to claim 9, wherein the difference threshold value is a function of at least one exhaust gas parameter or at least one operating parameter of the internal combustion engine.

11. A method according to claim 9, further comprising delaying the averaging of the exhaust gas component measurement with respect to the averaging of the calculated value for the exhaust gas component for a delay time in order to compensate for an exhaust gas running time.

12. A method according to claim 9, wherein provision is made for a check to determine if the exhaust gas component measurement during the diagnostic time period leaves a tolerance band.

13. A method according to claim 12, further comprising specifying the tolerance band as a function of at least one exhaust gas parameter or as a function of at least one operating parameter of the internal combustion engine.

14. A device to diagnose an exhaust gas sensor disposed in an exhaust gas region of an internal combustion engine, wherein provision is made for a comparison of a measurement for at least one exhaust gas component with a measurement of an exhaust gas component, which is ascertained on the basis of an exhaust gas sensor signal, wherein provision is made for a specially designed control unit to implement a method including detecting a change in at least one operating parameter of the internal combustion engine or a change in at least one exhaust gas parameter during running operation of the internal combustion engine; ascertaining an exhaust gas component measurement from the exhaust gas sensor during running operation of the internal combustion engine; and comparing the exhaust gas component measurement to a calculated value of the exhaust gas component measurement, the calculated value being based upon at least one operating parameter during running operation of the internal combustion engine; wherein the diagnosis is non-intervening into a control loop of the internal combustion engine and, where an emission control system is present, non-intervening into a control loop for the metering of a reagent substance into an exhaust gas region of the internal combustion engine.

15. A control unit program, which executes all steps of a method including detecting a change in at least one operating parameter of the internal combustion engine or a change in at least one exhaust gas parameter during running operation of the internal combustion engine; ascertaining an exhaust gas component measurement from the exhaust gas sensor during running operation of the internal combustion engine; and comparing the exhaust gas component measurement to a calculated value of the exhaust gas component measurement, the calculated value being based upon at least one operating parameter during running operation of the internal combustion engine; wherein the diagnosis is non-intervening into a control loop of the internal combustion engine and, where an emission control system is present, non-intervening into a control loop for the metering of a reagent substance into an exhaust gas region of the internal combustion engine.

16. A control unit program product with a program code stored on a machine-readable carrier to implement a method including detecting a change in at least one operating parameter of the internal combustion engine or a change in at least one exhaust gas parameter during running operation of the internal combustion engine; ascertaining an exhaust gas component measurement from the exhaust gas sensor during running operation of the internal combustion engine; and comparing the exhaust gas component measurement to a calculated value of the exhaust gas component measurement, the calculated value being based upon at least one operating parameter during running operation of the internal combustion engine; wherein the diagnosis is non-intervening into a control loop of the internal combustion engine and, where an emission control system is present, non-intervening into a control loop for the metering of a reagent substance into an exhaust gas region of the internal combustion engine.

* * * * *

UNITED STATES PATENT AND TRADEMARK OFFICE
CERTIFICATE OF CORRECTION

PATENT NO. : 7,913,550 B2  
APPLICATION NO. : 12/028545  
DATED : March 29, 2011  
INVENTOR(S) : Schoenthaler et al.

It is certified that error appears in the above-identified patent and that said Letters Patent is hereby corrected as shown below:

Col. 7, line 18, claim 1: "during miming operation" should read --during running operation--

Signed and Sealed this
Twenty-ninth Day of November, 2011

David J. Kappos
*Director of the United States Patent and Trademark Office*